(12) United States Patent
Muthusamy et al.

(10) Patent No.: US 8,822,605 B2
(45) Date of Patent: Sep. 2, 2014

(54) PH SENSITIVE GRAFT COPOLYMER

(75) Inventors: Ramesh Muthusamy, Pune (IN); Mohan Gopalkrishna Kulkarni, Pune (IN)

(73) Assignee: Council of Scientific & Industrial Research, New Delhi (IN)

(*) Notice: Subject to any disclaimer, the term of this patent is extended or adjusted under 35 U.S.C. 154(b) by 203 days.

(21) Appl. No.: 13/254,630

(22) PCT Filed: Mar. 5, 2010

(86) PCT No.: PCT/IB2010/000460
§ 371 (c)(1),
(2), (4) Date: Nov. 10, 2011

(87) PCT Pub. No.: WO2010/103366
PCT Pub. Date: Sep. 16, 2010

(65) Prior Publication Data
US 2012/0059131 A1  Mar. 8, 2012

(30) Foreign Application Priority Data
Mar. 9, 2009  (IN) .............................. 452/DEL/2009

(51) Int. Cl.
*C08F 283/02* (2006.01)
*C08F 283/01* (2006.01)

(52) U.S. Cl.
CPC .................................... *C08F 283/01* (2013.01)
USPC ........................................................ 525/445

(58) Field of Classification Search
USPC ........................................................ 525/445
See application file for complete search history.

(56) References Cited

U.S. PATENT DOCUMENTS

| | | | | |
|---|---|---|---|---|
| 3,954,841 A | * | 5/1976 | Stackman | 560/91 |
| 4,038,257 A | * | 7/1977 | Suzuki et al. | 528/75 |
| 4,983,401 A | | 1/1991 | Eichel et al. | |
| 5,002,976 A | * | 3/1991 | McConnell et al. | 522/107 |
| 5,280,089 A | * | 1/1994 | DeGraaf et al. | 525/445 |
| 5,449,707 A | | 9/1995 | Higashiura et al. | |
| 5,770,627 A | | 6/1998 | Inoue et al. | |
| 5,811,121 A | | 9/1998 | Wu et al. | |

OTHER PUBLICATIONS

Lai, X. et al., "Evaluation of poly(styrene-alt-maleic anhydride)-ethanol as enteric coating material," *International Journal of Pharmaceutics*, 2008, pp. 66-73, vol. 352.

Basan, H. et al., "Diclofenac sodium releasing pH-sensitive monolithic devices," *International Journal of Pharmaceutics*, 2002, pp. 191-198, vol. 245.

Huang, Y, et al., "pH-sensitive cationic guar gum/poly (acrylic acid) polyelectrolyte hydrogels: Swelling and in vitro drug release," *Carbohydrate Polymers*, 2007, pp. 774-783, vol. 69.

Kurkuri, M.D., et al., "Poly(vinyl alcohol) and poly(acrylic acid) sequential interpenetrating network pH-sensitive microspheres for the delivery of diclofenac sodium to the intestine," *Journal of Controlled Release*, 2004, pp. 9-20, vol. 96.

Shin, H.S., et al., "Indomethacin Release Behaviors from pH and Thermoresponsive Poly (vinyl alcohol) and Poly(acrylic acid) IPN Hydrogels for Site-Specific Drug Delivery," *Journal of Applied Polymer Science*, 1997, pp. 685-693, vol. 65.

Sipahigil, O. et al, "Release behaviour and biocompatibility of drug-loaded pH sensitive particles," *International Journal of Pharmaceutics*, 2006, pp. 130-138, vol. 311.

Sousa, R.G. et al., "Dependence of copolymer composition, swelling history, and drug concentration on the loading of diltiazem hydrochloride (DIL.HCI) into poly[(N-isopropylacrylamide)-co-(methacrylic acid)] hydrogels and its release behaviour from hydrogel slabs," *Journal of Controlled Release*, 2005, pp. 595-606, vol. 102.

Cornejo-Bravo, J.M., et al., "Drug release from complexes with a series of poly(carboxyakyl methaerylates), a new class of weak polyelectrolytes," *International Journal of Pharmaceutics*, 2005, pp. 52-60, vol. 305.

Toti, U.S., et al., "Modified guar gum matrix tablet for controlled release of diltiazem hydrochloride," *Journal of Controlled Release*, 2004, pp. 567-577, vol. 95.

Huang, M. et al., "Syntheses and characterization of novel pH-sensitive graft copolymers of maleoylchitosan and poly(acrylic acid)," *Reactive & Functional Polymers*, 2006, pp. 1041-1046, vol. 66.

Lee, Y.M. et al., "Preparation of surface-modified stimuli-responsive polymeric membranes by plasma and ultraviolet grafting methods and their riboflavin permeation," *Polymer*, 1995, pp. 81-85, vol. 36, No. 1.

Shimizu, T. et al., "Preparation of an Acrylics-Grafted Polyester and Its Aqueous Dispersion," *Journal of Applied Polymer Science*, 1999, pp. 1817-1825, vol. 72.

Shimizu, T. et al., "Preparation of an Acrylic-Grafted Polyester and Its Aqueous Dispersion: Grafting Utilizing Alternating Copolymerization," *Journal of Applied Polymer Science*, 1999, pp. 1395-1403, vol. 74.

International Search Report issued in International Application No. PCT/IB2010/000460 on Jul. 6, 2010.

* cited by examiner

*Primary Examiner* — Doris Lee
(74) *Attorney, Agent, or Firm* — Oliff PLC

(57) ABSTRACT

Graft copolymer (P) which exhibit pH dependent swelling/dissolution properties comprising a hydrophobic back-bone and graft chains comprising acidic monomer. This Graft copolymer (P) do not swell or dissolve at acidic pH prevalent in the stomach and they swell/dissolve at near neutral pH prevalent in the intestinal region. The graft copolymer (P) is useful for the development of drug delivery formulations particularly for oral drug delivery formulations.

15 Claims, No Drawings

PH SENSITIVE GRAFT COPOLYMER

FIELD OF THE INVENTION

The present invention relates to graft copolymer (P) of formula 1 which exhibits pH dependent behavior

The present invention further relates to the graft copolymer (P) of formula 1 designed as to respond to changes in pH along the gastrointestinal tract.

BACKGROUND OF THE INVENTION pH sensitive polymers for oral drug delivery systems have been widely studied. These polymers can undergo reversible transformation from dissolved state to collapsed state and vice versa in response to variation in the pH of the gastrointestinal tract. The currently available pH sensitive polymers in the market are Eudragit L, Cellulose acetate phthalate, Cellulose acetate trimellitate, Hydroxypropyl methylcellulose phthalate, Hydroxypropyl methyl cellulose acetate succinate and Polyvinyl acetate phthalate. These polymers are not soluble under acidic pH condition and dissolve rapidly in neutral and alkaline media. They are being used as enteric coatings for the dosage forms which have to protect the drug at the acidic pH conditions in stomach. The rapid dissolution of the polymers at near neutral pH limits their utility in sustained release of drugs in intestine.

Many attempts have been made to develop new pH sensitive polymers for drug delivery applications. One of the approaches is the functional modification of natural and synthetic polymers to introduce pH sensitive behavior. References may be made to patent application U.S. Pat. No. 5,811,121, wherein Wu et al. disclosed a cellulose modification to obtain pH sensitive polymer. Acetoacetylation of cellulose resulted in a series of cellulose acetoacetate esters depending upon the degree of substitution. These polymers are claimed to be insoluble at acidic condition but dissolve readily at pH>7.5. The exact dissolution pH depends upon the degree of substitution.

References may be made to Journal "Xiaolin Lai, Chengdong Sun, Hua Tian, Wenjun Zhao and Lin Gao, International Journal of Pharmaceutics, 352, 66-73, 2008" wherein the modification of poly (styrene-alt-maleic anhydride) copolymer by partial esterification of carboxyl groups with ethanol have described. The modified polymer does not dissolve at pH<6.0 but dissolves readily at pH>6.4. Coating the polymer on erythromycin tablets suppressed the drug release at acidic pH condition and released rapidly at near neutral pH condition.

References may be made to patent application U.S. Pat. No. 4,983,401, wherein Eichel et al. modified the enteric polymer cellulose acetate phthalate with a stearyl chloride to control its dissolution at near neutral pH. The modified enteric polymer remained hydrophobic at pH found in the stomach and became hydrophilic but remained insoluble at intestinal pH condition. The problem associated with polymers comprising phthalate groups such as cellulose acetate phthalate, Hydroxypropyl methylcellulose phthalate and polyvinyl acetate phthalate is their storage stability. On storage the phthalate groups undergo hydrolysis and leave behind phthalic acid residues. This leads to unpredictable dissolution behavior of the polymer with respect to pH.

Hydrogels are the most frequently investigated systems for development of drug delivery systems. References may be made to Journal "Hasan Basan, Menemş e Gümüş derelloğlu and Tevfik Orbey, International Journal of Pharmaceutics, 245, 191-198, 2002" wherein a pH sensitive hydrogel for the sustained release of drugs is described. Copolymerization of acrylic acid, 2-Hydroxyethyl methacrylate and ethylene glycol dimethacrylate in the presence of drug diclofenac sodium provided a pH sensitive drug delivery device. However, the presence of cross linking renders these materials unsuitable for coating drugs.

References may be made to Journal "Yihong Huang, Huiqun Yu and Chaobo Xiao, Carbohydrate Polymers, 69, 774-783, 2007" wherein a polyelectrolyte hydrogel composition based on cationic guar gum and polyacrylic acid are described. An aqueous solution of cationic guar gum, acrylic acid monomer, drug and a photo initiator was exposed to the UV irradiation. The drug release was substantial in both acidic and neutral media.

References may be made to Journal "Mahaveer D. Kurkuri and Tejraj M. Aminabhavi, Journal of Controlled Release, 96, 9-20, 2004" wherein a pH sensitive polymer composition prepared in the form of microspheres using polyvinyl alcohol and polyacrylic acid interpenetrating network crosslinked with gluteraldehyde is described. The drug was incorporated during the preparation of microspheres. The microspheres swelled less at acidic pH condition than at near neutral pH condition. Hydrogels were prepared in the presence of drug. However, the solubility of drug within the monomer mixture, the drug stability, possible reaction between drug and reactive monomers during the polymerization and removal of unreacted monomers from the drug loaded hydrogels limited utility of these materials in the industry.

References may be made to Journal "Heung Soo Shin, So Yeon Kim and Young Moo Lee, J Appl Polym Sci 65, 685-693, 1997" wherein drug can also be loaded by soaking the purified hydrogel in the drug solution as described by Shin et al. A pH and thermosensitive interpenetrating network hydrogel was obtained by copolymerization of acrylic acid and methylene bis acrylamide in the presence of polyvinyl alcohol. The drug loading was achieved by imbibing the hydrogel in drug solution. The hydrogels could release 1.5-2.0 mg drug at pH 7.0 for the period of 25 hours.

References may be made to Journal "Oya Sipahigil, Ayla Gürsoy, Fulya Çakalağaoğlu and İmer Okar, International Journal of Pharmaceutics, 311, 130-138, 2006" wherein drug loading by soaking the pH sensitive crosslinked particles obtained by copolymerization of methacrylic acid and poly (ethylene glycol) monomethacrylate using tetra (ethylene glycol) dimethacrylate as a crosslinker. The drug loaded particles could suppress the drug release at pH 1.2, and release the drug up to 10 hours at the pH range of 5.8-7.4. However, the drug loading was only about 0.54 to 2.09% and could not be increased by increasing the drug concentration in the solution. Clearly such low drug loadings are not acceptable in pharmaceutical dosage forms as the amount of excipient needed would be very large and may not meet regulatory requirements.

It is evident from the above disclosures that the drug loading by imbibition method is not effective since the achievable drug loading is far less than the required drug content. The selection of medium for drug loading is limited, since the drug dissolution as well as hydrogel swelling has to be achieved to enhance the loading. Most importantly, the hydrogels are insoluble in solvents and they are not suitable for many of the process techniques to obtain diverse dosage forms. Drying of swollen hydrogels is energy consuming, limits production rates and influence drug stability adversely.

References may be made to Journal "Ricardo G. Sousa, Alberto Prior-Cabanillas, Isabel Quijada-Garrido and José

M. Barrales-Rienda, Journal of Controlled Release, 102, 595-606, 2005" wherein copolymerized N-isopropyl acrylamide and methacrylic acid as a functional monomers and tetraethylene glycol dimethacrylate as a crosslinking agent. The drug was loaded by soaking the hydrogel in drug solution. The interaction between carboxyl groups present in the polymer and the cationic group of drug enhanced the loading up to 17%. The enhancement in drug loading would thus depend on the basicity of the drug. The system also suffers from all the limitations of a crosslinked polymer. References may be made to Journal "Jose M. Cornejo-Bravo, Maria E. Flores-Guillen, Eder Lugo-Medina and Angel Licea-Claverie, International Journal of Pharmaceutics, 305, 52-60, 2005" wherein Drug-polyelectrolyte complex composition is described. It is an ionic complex comprising poly carboxyalkyl methacrylate and cationic drug. About 75% drug loading was achieved by aqueous precipitation method. The drug release was suppressed at acidic pH condition and sustained at pH 7.4. As mentioned earlier, utility of such compositions is limited to specific drug-polymer systems.

References may be made to patent application U.S. Pat. No. 5,770,627, wherein the bioadhesive graft copolymer composition in for the topical drug delivery application is disclosed. involves preparation of hydrophobic macro monomer and copolymerizing same with acrylic acid to yield graft copolymer. The dissolution of the polymers in neutral and alkaline condition depends upon composition. However, the swelling or dissolution behaviour of the polymers at acidic pH condition was not disclosed. The formulations were developed by dissolving the polymer in phosphate buffer saline and mixing with cationic drug solution to yield drug-polyelectrolyte complex.

It is evident from the above descriptions that the drug loading can be enhanced by complexation of polyelectrolyte with drug. However, this approach is limited to systems wherein the polymer and drug contain opposite charges. There are numerous drugs which are nonionic in nature and can not form complex with the polymers.

There are some reports which describe the utilization of pH sensitive graft copolymer for the development of drug delivery systems. References may be made to Journal "Udaya S. Toti and Tejraj M. Aminabhavi, Journal of Controlled Release, 95, 567-577, 2004" wherein One such polymer composition is acrylamide grafted guar gum is described. Hydrolysis of polyacrylamide graft chains leads to polyacrylic acid graft chains. While the acrylamide grafted guar gum releases the drug diltiazem hydrochloride for 8 hours, acrylic acid grafted guar gum releases the drug up to 12 hours. The formulation comprising only drug and polymer showed the drug release up to 27% in 0.1 N HCL solution and rest of the drug was released in pH 7.4 phosphate buffer solution. The graft copolymer did not show pH dependent drug release.

References may be made to Journal "Meifang Huang, Xin Jin, Yu Li and Yue'e Fang, Reactive & Functional Polymers, 66, 1041-1046, 2006" wherein a pH sensitive graft copolymer composition is described. The polymer was prepared by grafting of acrylic acid monomer on the maleoylchitosan to obtain graft copolymers comprising various levels of acrylic acid. These polymers swelled at pH<4.0 as well as at higher pH 10, but deswelled in the pH range 6-8.

References may be made to Journal "Young Moo Lee, Sung Yoon Ihm, Jin Kie Shim, Jin Hong Kim, Chong Soo Cho and Yong Kiel Sung, Polymer, 36, 81-85, 1995" wherein a polymer composition which exhibited pH dependent permeability of the drug is described. The surface of the polyamide membrane was modified with functional monomers like acrylic acid and methacrylic acid using plasma polymerization and ultraviolet irradiation techniques. The permeation of membrane was studied using the drug riboflavin at various pH. The permeation of riboflavin decreased from pH 4-5 and 6-7 for the acrylic acid grafted and methacrylic grafted membranes respectively. This low permeability in the pH range 4-5 and 6-7 limits the application of this polymer in oral drug delivery where the pH of the gastrointestinal tract various from 1.8-7.4.

References may be made to Journal "Toshiyuki Shimizu, Shinya Higashiura and Masakatsu Ohguchi, Journal of Applied Polymer Science, 72, 1817-1825, 1999" wherein acrylic acid grafted polyester water dispersible coating composition obtained by grafting of acrylic acid on the fumaric unsaturation of polyester is described. The conversion of unsaturation after the grafting reaction was about 50%. Since the reactivity of acrylic acid monomer towards the fumaric unsaturation was low, ethylacrylate was used as a comonomer. Complete conversion of unsaturation was achieved. However, the achievable incorporation of acrylic acid was limited, since it was partially replaced by ethylacrylate. Also the unreacted unsaturated groups can lead to crosslinking during processing rendering these materials insoluble in solvents and hence can not be dissolved in solvents for coating the drugs.

References may be made to Journal "Toshiyuki Shimizu, Shinya Higashiura and Masakatsu Ohguchi, Journal of Applied Polymer Science, 74, 1395-1403, 1999" wherein in order to increase the incorporation of hydrophilic monomer, another approach was described. Styrene and maleic anhydride monomers were copolymerized with the unsaturated polyester. Eventhough, this approach could enhance the incorporation of hydrophilic monomer, the conversion of unsaturations present in the polyester was only upto 60% after the grafting reaction. It is known that polymers with free unsaturations are susceptible to undergo polymerization at any stage of processing which would result in crosslinking. Also, the pH dependent dissolution of these polymers and their utility in the development of drug delivery systems has not been reported.

It is evident from the above disclosures that the pH sensitive random copolymers like Eudragit L undergo rapid dissolution at near neutral pH while retaining its integrity under acidic pH conditions. The graft copolymers described in the above descriptions, do not undergo delayed dissolution in response to the variation of pH along the gastrointestinal tract. Therefore, there is a need for solvent soluble pH sensitive polymers which swell/dissolve in response to change of pH in the gastrointestinal tract. The present invention describes such polymer compositions.

OBJECTIVE OF THE INVENTION

The main objective of the present invention is to provide graft copolymer (P) which exhibit pH dependent behavior.

The another objective of the present invention is to provide graft copolymer (P) of formula 1 designed as to respond to changes in pH along the gastrointestinal tract.

SUMMARY OF THE INVENTION

Accordingly, present invention provides a graft copolymer (P) of formula 1 which exhibits pH dependent behavior

Formula 1 comprises:
(i) a backbone having the formula P [A$_{(x)}$ B$_{(y)}$ C$_{(z)}$] comprising: a diol (A), a dicarboxylic acid or acid anhydride (B) and a monomer containing pendent unsaturation (C) wherein (x)=37-46%, (y)=49-55% (z)=5-8% by mole; and (ii) a graft which is a polymer of the acidic monomer (D) and 'w' is weight percent of the total weight of the said graft copolymer such that 'w' is 22-56%.

In an embodiment of the present invention, the backbone is poly (ester-ether) or polyester.

In another embodiment of the present invention, the diol is selected from the group consisting of aliphatic diol, cycloaliphatic diol and aromatic diol.

In yet another embodiment of the present invention, the aliphatic diol is selected from the group consisting of diethylene glycol, triethylene glycol, tetraethylene glycol, dipropylene glycol, tripropylene glycol, polyethylene glycol ($M_n$~200), polyethylene glycol ($M_n$~400), polyethylene glycol ($M_n$~1000), polyethylene glycol ($M_n$~2000), 1,2-ethane diol, 1,3-propane diol, 1,2-propane diol, 2-methyl-1,3-propane diol, 1,4-butane diol, 1,3-butane diol, 1,2-butane diol, 1,5-pentane diol, 1,6-hexane diol, 1,7-heptane diol, 1,8-octane diol, 1,9-nonane diol and 1,12-dodecane diol.

In yet another embodiment of the present invention, the cycloaliphatic diol is 1,4-cyclohexanedimethanol.

In yet another embodiment of the present invention, the aromatic diol is bis(2-hydroxyethyl) terephthalate.

In still another embodiment of the present invention, the dicarboxylic acid is selected from the group consisting of succinic acid, glutaric acid, adipic acid, pimelic acid, suberic acid, azelaic acid, sebacic acid and dodecanedioic acid.

In yet another embodiment of the present invention, the acid anhydride is selected from succinic anhydride and phthalic anhydride.

In still another embodiment of the present invention, the monomer containing pendant unsaturation is an epoxy monomer or a diol monomer.

In yet another embodiment of the present invention, wherein the epoxy monomer is selected from glycidyl methacrylate and glycidyl acrylate.

In still another embodiment of the present invention, the diol monomer is selected from trimethylolpropane monomethacrylate and trimethylolpropane monoacrylate.

In yet another embodiment of the present invention, the acidic monomer is a carboxylic acid selected from acrylic acid and methacrylic acid.

In yet another embodiment of the present invention, process for preparation of graft copolymer comprising the steps of (i) stirring monomer (C), titanium (IV) butoxide and hydroquinone in two neck round bottom flask for 10-15 minutes;

(ii) adding diol (A), dicarboxylic acid or acid anhydride (B) and raising the temperature to 160-170° C. over 45 minutes, applying vacuum of 170 mm Hg at the end of 5-7 hours and continuing the reaction for 3-5 hours to obtain unsaturated polyester or unsaturated poly (ester-ether);

(iii) dissolving the unsaturated polyester or unsaturated poly (ester-ether) as obtained in step (ii) in chloroform and precipitating in cold methanol;

(iv) filtering, washing with methanol and drying for 20-25 hours to obtain unsaturated polyester or unsaturated poly (ester-ether);

(v) dissolving the unsaturated polyester or unsaturated poly (ester-ether) as obtained in step (iv), acidic monomer and azobisisobutyronitrile in dimethyl formamide followed by purging with nitrogen and polymerizing at 60-70° C. for 18-22 hours;

(vi) concentrating, precipitating and drying to obtain graft copolymer.

In yet another embodiment of the present invention, the graft copolymer is soluble in organic solvents selected from dimethylformamide, dimethylacetamide, tetrahydrofuran and mixture of organic solvents selected from chloroform-methanol, chloroform-ethanol, 1,2-dichloromethane-methanol and 1,2-dichloromethane-ethanol.

In yet another embodiment of the present invention, the pH sensitive graft copolymer swells or dissolves at pH>4.7.

In yet another embodiment of the present invention, the pH sensitive graft copolymer swells and dissolves at pH>4.7.

DETAILED DESCRIPTION OF INVENTION

The present invention provides a pH sensitive graft copolymer having the formula 1

Formula 1 which comprises;

(i) a backbone having the formula P [$A_{(x)}$ $B_{(y)}$ $C_{(z)}$] comprising (A) a diol, (B) a dicarboxylic acid or acid anhydride and (C) a monomer containing pendent unsaturation wherein (x)=37-46%, (y)=49-55% (z)=5-8% by mole; and (ii) a graft which is a polymer of the acidic monomer (D) which comprises 'w' weight percent of the total weight of the said pH sensitive graft copolymer such that 'w' is 22-56%.

The backbone is polyester or poly (ester-ether).

The diol (A) is selected from the group comprising aliphatic diol, cycloaliphatic diol and aromatic diol. The aliphatic diol is selected from diethylene glycol, triethylene glycol, tetraethylene glycol, dipropylene glycol, tripropylene glycol, polyethylene glycol ($M_n$~200), polyethylene glycol ($M_n$~400), polyethylene glycol ($M_n$~1000), polyethylene glycol ($M_n$~2000), 1,2-ethane diol, 1,3-propane diol, 1,2-propane diol, 2-methyl-1,3-propane diol, 1,4-butane diol, 1,3-butane diol, 1,2-butane diol, 1,5-pentane diol, 1,6-hexane diol, 1,7-heptane diol, 1,8-octane diol, 1,9-nonane diol and 1,12-dodecane diol. The cycloaliphatic diol is 1,4-cyclohexanedimethanol. The aromatic diol is bis(2-hydroxyethyl) terephthalate.

The dicarboxylic acid or acid anhydride (B) is selected from succinic acid, glutaric acid, adipic acid, pimelic acid, suberic acid, azelaic acid, sebacic acid, dodecanedioic acid, succinic anhydride and phthalic anhydride.

The monomer containing pendent unsaturation (C) is selected from glycidyl methacrylate, glycidyl acrylate, trimethylolpropane monomethacrylate and trimethylolpropane monoacrylate.

The acidic monomer (D) is selected from acrylic acid and methacrylic acid.

The development of pH sensitive graft copolymer comprising the steps: (a) synthesis of unsaturated polyester or unsaturated poly (ester-ether) i.e. backbone and (b) their graft copolymerization with acidic monomer. The backbone is prepared by melt polycondensation of a diol (A), a dicarboxylic acid or acid anhydride (B) and a monomer having pendant unsaturation (C) to yield a backbone in the form of unsaturated polyester or unsaturated poly (ester-ether) having the formula P [$A_{(x)}$ $B_{(y)}$ $C_{(z)}$]. The reaction was carried out in the presence of Titanium (IV) butoxide and hydroquinone.

The backbones were grafted with acidic monomer using various weight ratios by free radical copolymerization. The reaction was carried out in organic solvent in the presence of azobisisobutyronitrile. The obtained graft copolymers do not contain free unsaturations as all of them are utilized during the grafting reaction. The synthesized graft copolymers are soluble in organic solvents such as dimethylformamide, dimethylacetamide, tetrahydrofuran and mixture of organic solvents such as chloroform-methanol, chloroform-ethanol, 1,2-dichloromethane-methanol and 1,2-dichloromethane-ethanol.

In one aspect of the invention, pH sensitive graft copolymer of Formula 1 is prepared by a process comprising the steps of:
  i. stirring monomer (C), titanium (IV) butoxide and hydroquinone in two neck round bottom flask for 15 minutes;
  ii. adding diol (A), dicarboxylic acid or acid anhydride (B) and raising the temperature to 170° C. over 45 minutes, applying vacuum of 170 mm Hg at the end of 6 hours and continuing the reaction for 4 hours to obtain unsaturated polyester or unsaturated poly (ester-ether);
  iii. dissolving the unsaturated polyester or unsaturated poly (ester-ether) as obtained in step (ii) in chloroform and precipitating in cold methanol;
  iv. filtering, washing with methanol and drying for 24 hours to obtain unsaturated polyester or unsaturated poly (ester-ether);
  v. dissolving the unsaturated polyester or unsaturated poly (ester-ether) as obtained in step (iv), acidic monomer and azobisisobutyronitrile in dimethyl formamide followed by purging with nitrogen and polymerizing at 65° C. for 20 hours;
  vi. concentrating, precipitating and drying to obtain graft copolymer.

The degree of swelling was determined using the specimen in the film form. The polymer films were prepared by solution casting method. Thickness and diameter of the films were 200 μm and 2 cm respectively. The degree of swelling of polymer films was determined by placing them in 0.1 N HCl for the first 2 hours followed by pH 6.8 phosphate buffer solutions. At regular interval the films were removed and blotted with tissue paper to remove excess water in the surface and weighed. The degree of swelling (DS) of the films was calculated using the equation, $$DS = [(W_s - W_d)/W_d] \times 100$$

Where, $W_s$ and $W_d$ are the swollen and dry weight of the polymer respectively.

The graft copolymers of the instant invention were studied for their pH dependent behavior as described herein. As seen in examples 1 to 10, the graft copolymers displayed swelling to disintegration/dissolution with respect to time. The decrease in degree of swelling with respect to time indicates the dissolution of polymer. The polymer dissolves completely when the degree of swelling approaches −100%.

The following examples are presented in order to further illustrate the invention. It will be apparent to those skilled in the art, that many modifications, both to materials and methods can be practiced without departing from the purpose and intent of this invention. The examples that follow are not intended to limit the scope of the invention as described herein above or as claimed below.

In the examples the diol, acidic anhydride, dibasic acid, unsaturated monomer and acidic monomer are described by the following abbreviations.

1,2 ED—1,2 Ethane diol, 1,4 BD—1,4 Butane diol, 1,6 HD—1,6 Hexane diol, 1,12 DD—1,12 Dodecane diol, DEG—Diethylene glycol, TEG—Triethylene glycol, PEG—Polyethylene glycol ($M_n$~400), 1,4 CD—1,4 Cyclohexane dimethanol, BHET—bis(2-hydroxyethyl) terephthalate, SA—Succinic acid, SEB—Sebasic acid, AA—Adipic acid, DDA—Dodecanedioic acid, FA—Fumaric acid, IA—Itaconic acid, PA—Phthalic anhydride, AGE—Allyl glycidyl ether, TMPAE—Trimethylolpropane monoallyl ether, GMA—Glycidyl methacrylate, TMPA—Trimethylolpropane monoacrylate, TMPMA—Trimethylolpropane monomethacrylate, MAA—Methacrylic acid and AAc—Acrylic acid.

COMPARATIVE EXAMPLE 1

This example discloses the preparation of P

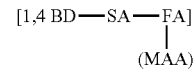

graft copolymer.

This involves, the preparation of (a) unsaturated polyester P [1,4 BD-SA-FA] and (b) graft copolymerization on said unsaturated polyester with MAA.

A. Preparation of Unsaturated Polyester

The unsaturated polyester was prepared by melt polycondensation of 1,4 BD, SA and FA using Titanium (IV) butoxide and hydroquinone. The reaction was carried out in a two neck round-bottom flask equipped with a nitrogen containing bladder and a water cooled condenser. The flask was charged with 10.900 g (0.1209 moles) of 1,4 BD, 11.712 g (0.0991 moles) of SA, 2.527 g (0.0217 moles) of FA, 0.025 g ($7.3481 \times 10^{-05}$ moles) of Titanium (IV) butoxide and 0.200 g ($1.8163 \times 10^{-03}$ moles) of hydroquinone. The temperature of the flask was raised to 170° C. over 45 minutes. After 6 hours of reaction, 170 mm Hg of vacuum was applied and the reaction was continued for further 4 hours. The polyester obtained was dissolved in chloroform and precipitated in cold methanol. The precipitate was filtered and washed with methanol two times and then air dried for 24 hours. The molar composition of 1,4 BD, SA and FA in unsaturated polyester was determined by peak integral value of $^1$H NMR spectrum. The weight average molecular weight of unsaturated polyester was determined by Gel Permeation Chromatography using Styragel column and tetrahydrofuran as eluting solvent at the rate of 1 ml/min. Polystyrene was used as standard. The molar composition of the unsaturated polyester and its weight average molecular weight were 49:43:8 (1,4 BD:SA:FA) and 8486 g mol$^{-1}$ respectively.

B. Preparation of Graft Copolymer

The graft copolymer was prepared by solution polymerization. The unsaturated polyester P [1,4 BD-SA-FA], MAA and 1% wt/wt. of free radical initiator azobisisobutyronitrile were dissolved in dimethylformamide. After purging with nitrogen, polymerization was carried out at 65° C. for 20 hours. The polymer solution was concentrated by using rota-evaporator. The polymer was precipitated into cold water and dried at room temperature under vacuum. The said graft copolymer was prepared as to incorporate four different levels of MAA by varying the weight ratio of the unsaturated polyester to MAA in the feed. The MAA content of the graft copolymers was 24, 26, 27 and 30 wt. %. The $^1$H NMR spectrum of the graft copolymer showed that the unsaturations were not completely utilized during the grafting reaction. On storage the free unsaturations polymerized and resulted in a crosslinked polymer network. The crosslinked polymers did not dissolve in common organic solvents and their mixtures.

COMPARATIVE EXAMPLE 2

This example discloses the preparation of P

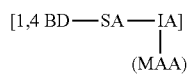

graft copolymer.

This involves, the preparation of (a) unsaturated polyester P [1,4 BID-SA-IA] and (b) graft copolymerization on said unsaturated polyester with MAA.

A. Preparation of Unsaturated Polyester

The unsaturated polyester was prepared by melt polycondensation of 1,4 BD, SA and IA using Titanium (IV) butoxide and hydroquinone. The reaction was carried out in a two neck round-bottom flask equipped with a nitrogen containing bladder and a water cooled condenser. The flask was charged with 8.660 g (0.0960 moles) of 1,4 BD, 9.078 g (0.0768 moles) of SA, 2.500 g (0.0192 moles) of IA, 0.020 g ($5.8785 \times 10^{-05}$ moles) of Titanium (IV) butoxide and 0.100 g ($9.0818 \times 10^{-04}$ moles) of hydroquinone. The temperature of the flask was raised to 170° C. over 45 minutes. After 6 hours of reaction, 170 mm Hg of vacuum was applied and the reaction was continued for further 4 hours. The polyester obtained was dissolved in chloroform and precipitated in cold methanol. The precipitate was filtered and washed with methanol two times and then air dried for 24 hours. The molar composition of 1,4 BD, SA and IA in unsaturated polyester was determined by peak integral value of $^1$H NMR spectrum. The weight average molecular weight of unsaturated polyester was determined by Gel Permeation Chromatography using Styragel column and tetrahydrofuran as eluting solvent at the rate of 1 ml/min. Polystyrene was used as standard. The molar composition of the unsaturated polyester and its weight average molecular weight were 49:45:6 (1,4 BD:SA:IA) and 5500 g mol$^{-1}$ respectively.

B. Preparation of Graft Copolymer

The graft copolymer was prepared by solution polymerization. The unsaturated polyester P [1,4 BD-SA-IA], MAA and 1% wt/wt. of free radical initiator azobisisobutyronitrile were dissolved in dimethylformamide. After purging with nitrogen, polymerization was carried out at 65° C. for 20 hours. The polymer solution was concentrated by using rota-evaporator. The polymer was precipitated into cold water and dried at room temperature under vacuum. The said graft copolymer was prepared as to incorporate four different levels of MAA by varying the weight ratio of the unsaturated polyester to MAA in the feed. The MAA content of the graft copolymers was 27, 30, 32 and 38 wt. %. The $^1$H NMR spectrum of the graft copolymer showed that the unsaturations were not completely utilized during the grafting reaction. On storage the free unsaturations polymerized and resulted in crosslinked polymer network. The crosslinked polymers did not dissolve in common organic solvents and their mixtures.

COMPARATIVE EXAMPLE 3

This example discloses the preparation of P

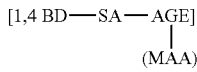

graft copolymer.

This involves, the preparation of (a) unsaturated polyester P [1,4 BD-SA-AGE] and (b) graft copolymerization on said unsaturated polyester with MAA.

A. Preparation of Unsaturated Polyester

The unsaturated polyester was prepared by melt polycondensation of 1,4 BD, SA and AGE using Titanium (IV) butoxide and hydroquinone. The reaction was carried out in a two neck round-bottom flask equipped with a nitrogen containing bladder and a water cooled condenser. The flask was charged with 3.199 g (0.0280 moles) of AGE, 0.200 g ($1.8163 \times 10^{-03}$ moles) of hydroquinone and 0.025 g ($7.3481 \times 10^{-05}$ moles) of Titanium (IV) butoxide and then stirred for 15 minutes. To this 8.00 g (0.0887 moles) of 1,4 BD and 13.793 g (0.1168 moles) of SA were added and the temperature was raised to 170° C. over 45 minutes. After 6 hours of reaction, 170 mm Hg of vacuum was applied and the reaction was continued for further 4 hours. The polyester obtained was dissolved in chloroform and precipitated in cold methanol. The precipitate was filtered and washed with methanol two times and then air dried for 24 hours. The molar composition of 1,4 BD, SA and AGE in unsaturated polyester was determined by peak integral value of $^1$H NMR spectrum. The weight average molecular weight of unsaturated polyester was determined by Gel Permeation Chromatography using Styragel column and tetrahydrofuran as eluting solvent at the rate of 1 ml/min. Polystyrene was used as standard. The molar composition of the unsaturated polyester and its weight average molecular weight were 40:51:9 (1,4 BD:SA:AGE) and 4100 g mol$^{-1}$ respectively.

B. Preparation of Graft Copolymer

The graft copolymer was prepared by solution polymerization. The unsaturated polyester P [1,4 BD-SA-AGE], MAA and 1% wt/wt. of free radical initiator azobisisobutyronitrile were dissolved in dimethylformamide. After purging with nitrogen, polymerization was carried out at 65° C. for 20 hours. The polymer solution was concentrated by using rota-evaporator. The polymer was precipitated into cold water and dried at room temperature under vacuum. The said graft copolymer was prepared as to incorporate four different levels of MAA by varying the weight ratio of the unsaturated polyester to MAA in the feed. The MAA content of the graft copolymers was 13, 13, 14 and 15 wt. %. The $^1$H NMR spectrum of the graft copolymer showed that the unsaturations were not completely utilized during the grafting reaction. On storage the free unsaturations polymerized and resulted in crosslinked polymer network. The crosslinked polymers did not dissolve in common organic solvents and their mixtures.

COMPARATIVE EXAMPLE 4

This example discloses the preparation of P

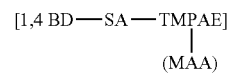

graft copolymer.

This involves, the preparation of (a) unsaturated polyester P [1,4 BD-SA-TMPAE] and (b) graft copolymerization on said unsaturated polyester with MAA.

A. Preparation of Unsaturated Polyester

The unsaturated polyester was prepared by melt polycondensation of 1,4 BD, SA and TMPAE using Titanium (IV) butoxide and hydroquinone. The reaction was carried out in a two neck round-bottom flask equipped with a nitrogen containing bladder and a water cooled condenser. The flask was charged with 7.023 g (0.0403 moles) of TMPAE, 0.400 g ($3.6327 \times 10^{-03}$ moles) of hydroquinone and 0.050 g (1.4696×

10$^{-04}$ moles) of Titanium (IV) butoxide and then stirred for 15 minutes. To this 16.550 g (0.1836 moles) of 1,4 BD and 26.446 g (0.2239 moles) of SA were added and the temperature was raised to 170° C. over 45 minutes. After 6 hours of reaction, 170 mm Hg of vacuum was applied and the reaction was continued for further 4 hours. The polyester obtained was dissolved in chloroform and precipitated in cold methanol. The precipitate was filtered and washed with methanol two times and then air dried for 24 hours. The molar composition of 1,4 BD, SA and, TMPAE in unsaturated polyester was determined by peak integral value of $^1$H NMR spectrum. The weight average molecular weight of unsaturated polyester was determined by Gel Permeation Chromatography using Styragel column and tetrahydrofuran as eluting solvent at the rate of 1 ml/min. Polystyrene was used as standard. The molar composition of the unsaturated polyester and its weight average molecular weight were 41:51:8 (1,4 BD:SA:TMPAE) and 6708 g mol$^{-1}$ respectively.

B. Preparation of Graft Copolymer

The graft copolymer was prepared by solution polymerization. The unsaturated polyester P [1,4 BD-SA-TMPAE], MAA and 1% wt/wt. of free radical initiator azobisisobutyronitrile were dissolved in dimethylformamide. After purging with nitrogen, polymerization was carried out at 65° C. for 20 hours. The polymer solution was concentrated by using rotaevaporator. The polymer was precipitated into cold water and dried at room temperature under vacuum. The said graft copolymer was prepared as to incorporate four different levels of MAA by varying the weight ratio of the unsaturated polyester to MAA in the feed. The MAA content of the graft copolymers was 10, 11, 13 and 16 wt. %. The $^1$H NMR spectrum of the graft copolymer showed that the unsaturations not completely utilized during the grafting reaction. On storage the free unsaturations polymerized and resulted in crosslinked polymer network. The crosslinked polymers did not dissolve in common organic solvents and their mixtures.

EXAMPLE 1

This example discloses the preparation of P

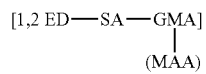

graft copolymer.

This involves, the preparation of (a) unsaturated polyester P [1,2 ED-SA-GMA] and (b) graft copolymerization on said unsaturated polyester with MAA.

A. Preparation of Unsaturated Polyester

The unsaturated polyester was prepared by melt polycondensation of 1,2 ED, SA and GMA using Titanium (IV) butoxide and hydroquinone. The reaction was carried out in a two neck round-bottom flask equipped with a nitrogen containing bladder and a water cooled condenser. The flask was charged with 3.424 g (0.0240 moles) of GMA, 0.160 g (1.4530×10$^{-03}$ moles) of hydroquinone and 0.020 g (5.8768× 10$^{-05}$ moles) of Titanium (IV) butoxide and then stirred for 15 minutes. To this 4.735 g (0.0762 moles) of 1,2 ED and 11.851 g (0.1003 moles) of SA were added and the temperature was raised to 170° C. over 45 minutes. After 6 hours of reaction, 170 mm Hg of vacuum was applied and the reaction was continued for further 4 hours. The polyester obtained was dissolved in chloroform and precipitated in cold methanol. The precipitate was filtered and washed with methanol two times and then air dried for 24 hours. The molar composition of 1,2 ED, SA and GMA in unsaturated polyester was determined by peak integral value of $^1$H NMR spectrum. The weight average molecular weight of unsaturated polyester was determined by Gel Permeation Chromatography using Styragel column and tetrahydrofuran as eluting solvent at the rate of 1 ml/min. Polystyrene was used as standard. The molar composition of the unsaturated polyester and its weight average molecular weight were 42:53:5 (1,2 ED:SA:GMA) and 5851 g mol$^{-1}$ respectively.

B. Preparation of Graft Copolymer

The graft copolymer was prepared by solution polymerization. The unsaturated polyester P [1,2 ED-SA-GMA], MAA and 1% wt/wt. of free radical initiator azobisisobutyronitrile were dissolved in dimethylformamide. After purging with nitrogen, polymerization was carried out at 65° C. for 20 hours. The polymer solution was concentrated by using rotaevaporator. The polymer was precipitated into cold water and dried at room temperature under vacuum. The said graft copolymer was prepared as to incorporate four different levels of MAA by varying the weight ratio of the unsaturated polyester to MAA in the feed. The MAA content of the graft copolymers and their swelling/dissolution behavior in 0.1 N HCl and in pH 6.8 phosphate buffer solutions are summarized in Table 1. The graft copolymers did not contain free unsaturations and they dissolved in common organic solvents and their mixtures.

TABLE 1

| The swelling degree of the graft copolymer | | | | | |
|---|---|---|---|---|---|
| Dissolution | Time | Methacrylic acid content (wt %) | | | |
| Medium | (hours) | 22 | 30 | 36 | 46 |
| 0.1N HCl Solution pH 6.8 phosphate buffer solution | 1 | 1.49 | 1.25 | 2.3 | 1.84 |
| | 2 | 1.81 | 1.63 | 3.64 | 2.82 |
| | 3 | −34.84 | −54.94 | −59.08 | −90.07 |
| | 4 | −96.83 | Dissolved | Dissolved | Dissolved |
| | 5 | −97.14 | — | — | — |
| | 7 | Dissolved | — | — | — |

EXAMPLE 2

This example discloses the preparation of P

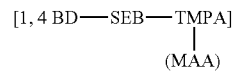

graft copolymer.

This involves, the preparation of (a) unsaturated polyester P [1,4 BD-SEB-TMPA] and (b) graft copolymerization on said unsaturated polyester with MAA.

A. Preparation of Unsaturated Polyester

The unsaturated polyester was prepared by melt polycondensation of 1,4 BD, SEB and TMPA using Titanium (IV) butoxide and hydroquinone. The reaction was carried out in a two neck round-bottom flask equipped with a nitrogen containing bladder and a water cooled condenser. The flask was charged with 7.156 g (0.0380 moles) of TMPA, 0.500 g (4.5409×10$^{-03}$ moles) of hydroquinone and 0.050 g (1.4692× 10$^{-04}$ moles) of Titanium (IV) butoxide and then stirred for 15 minutes. To this 10.830 g (0.1203 moles) of 1,4 BD and 32.03 g (0.1584 moles) of SEB were added and the temperature was raised to 170° C. over 45 minutes. After 6 hours of reaction, 170 mm Hg of vacuum was applied and the reaction was continued for further 4 hours. The polyester obtained was dissolved in chloroform and precipitated in cold methanol. The precipitate was filtered and washed with methanol two times and then air dried for 24 hours. The molar composition of 1,4 BD, SEB and TMPA in unsaturated polyester was determined by peak integral value of $^1$H NMR spectrum. The weight average molecular weight of unsaturated polyester was determined by Gel Permeation Chromatography using Styragel column and tetrahydrofuran as eluting solvent at the rate of 1 ml/min. Polystyrene was used as standard. The molar composition of the unsaturated polyester and its weight average molecular weight were 41:52:7 (1,4 BD:SEB:TMPA) and 19627 g mol$^{-1}$ respectively.

B. Preparation of Graft Copolymer

The graft copolymer was prepared by solution polymerization. The unsaturated polyester P [1,4 BD-SEB-TMPA], MAA and 1% wt/wt. of free radical initiator azobisisobutyronitrile were dissolved in dimethylformamide. After purging with nitrogen, polymerization was carried out at 65° C. for 20 hours. The polymer solution was concentrated by using rotaevaporator. The polymer was precipitated into cold water and dried at room temperature under vacuum. The said graft copolymer was prepared as to incorporate four different levels of MAA by varying the weight ratio of the unsaturated polyester to MAA in the feed. The MAA content of the graft copolymers and their swelling/dissolution behavior in 0.1 N HCl and in pH 6.8 phosphate buffer solutions are summarized in Table 2. The graft copolymers did not contain free unsaturations and they dissolved in common organic solvents and their mixtures.

TABLE 2

The swelling degree of the graft copolymer

| Dissolution Medium | Time (hours) | Methacrylic acid content (wt %) | | | |
|---|---|---|---|---|---|
| | | 25 | 39 | 46 | 53 |
| 0.1N HCl Solution | 1 | 2.71 | 1.32 | 2.46 | 1.57 |
| | 2 | 3.41 | 1.64 | 3.07 | 1.96 |
| pH 6.8 phosphate buffer solution | 3 | 59.98 | 71.67 | 83.00 | 85.27 |
| | 4 | 92.98 | 149.40 | 179.58 | 203.25 |
| | 5 | 116.26 | 366.46 | 399.22 | 209.76 |
| | 7 | 121.86 | 436.60 | 366.11 | 144.65 |
| | 9 | 151.44 | 460.32 | 158.83 | Dissolved |
| | 24 | 217.56 | 443.60 | Dissolved | Dissolved |

EXAMPLE 3

This example discloses the preparation of P

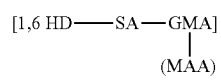

graft copolymer.

This involves, the preparation of (a) unsaturated polyester P [1,6 HD-SA-GMA] and (b) graft copolymerization on said unsaturated polyester with MAA.

A. Preparation of Unsaturated Polyester

The unsaturated polyester was prepared by melt polycondensation of 1,6 HD, SA and GMA using Titanium (IV) butoxide and hydroquinone. The reaction was carried out in a two neck round-bottom flask equipped with a nitrogen containing bladder and a water cooled condenser. The flask was charged with 8.764 g (0.0616 moles) of GMA, 0.500 g (4.5409×10$^{-03}$ moles) of hydroquinone and 0.050 g (1.4692×10$^{-04}$ moles) of Titanium (IV) butoxide and then stirred for 15 minutes. To this 17.00 g (0.1438 moles) of 1,6 HD and 24.269 g (0.2055 moles) of SA were added and the temperature was raised to 170° C. over 45 minutes. After 6 hours of reaction, 170 mm Hg of vacuum was applied and the reaction was continued for further 4 hours. The polyester obtained was dissolved in chloroform and precipitated in cold methanol. The precipitate was filtered and washed with methanol two times and then air dried for 24 hours. The molar composition of 1,6 HD, SA and GMA in unsaturated polyester was determined by peak integral value of $^1$H NMR spectrum. The weight average molecular weight of unsaturated polyester was determined by Gel Permeation Chromatography using Styragel column and tetrahydrofuran as eluting solvent at the rate of 1 ml/min. Polystyrene was used as standard. The molar composition of the unsaturated polyester and its weight average molecular weight were 37:55:8 (1,6 HD:SA:GMA) and 24027 g mol$^{-1}$ respectively.

B. Preparation of Graft Copolymer

The graft copolymer was prepared by solution polymerization. The unsaturated polyester P [1,6 HD-SA-GMA], MAA and 1% wt/wt. of free radical initiator azobisisobutyronitrile were dissolved in dimethylformamide. After purging with nitrogen, polymerization was carried out at 65° C. for 20 hours. The polymer solution was concentrated by using rotaevaporator. The polymer was precipitated into cold water and dried at room temperature under vacuum. The said graft copolymer was prepared as to incorporate four different levels of MAA by varying the weight ratio of the unsaturated polyester to MAA in the feed. The MAA content of the graft copolymers and their swelling/dissolution behavior in 0.1 N HCl and in pH 6.8 phosphate buffer solutions are summarized in Table 3. The graft copolymers did not contain free unsaturations and they dissolved in common organic solvents and their mixtures.

TABLE 3

The swelling degree of the graft copolymer

| Dissolution Medium | Time (hours) | Methacrylic acid content (wt %) | | | |
|---|---|---|---|---|---|
| | | 27 | 38 | 46 | 54 |
| 0.1N HCl Solution | 1 | 3.02 | 4.87 | 5.63 | 3.30 |
| | 2 | 3.14 | 4.87 | 6.14 | 3.41 |
| pH 6.8 phosphate buffer solution | 3 | 56.11 | 64.33 | 143.31 | 194.13 |
| | 4 | 80.43 | 99.51 | 117.66 | 20.65 |
| | 5 | 136.78 | 197.31 | 107.68 | −9.83 |
| | 7 | −28.77 | −37.61 | −55.29 | −70.08 |
| | 9 | −48.64 | −76.52 | −79.41 | −89.39 |
| | 24 | −63.06 | −80.01 | Dissolved | Dissolved |

EXAMPLE 4

This example discloses the preparation of P

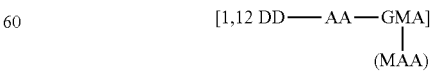

graft copolymer.

This involves, the preparation of (a) unsaturated polyester P [1,12 DD-AA-GMA] and (b) graft copolymerization on said unsaturated polyester with MAA.

A. Preparation of Unsaturated Polyester

The unsaturated polyester was prepared by melt polycondensation of 1,12 DD, AA and GMA using Titanium (IV) butoxide and hydroquinone. The reaction was carried out in a two neck round-bottom flask equipped with a nitrogen containing bladder and a water cooled condenser. The flask was charged with 0.647 g (4.554×10$^{-03}$ moles) of GMA, 0.030 g (2.7245×10$^{-04}$ moles) of hydroquinone and 0.005 g (1.4692× 10$^{-05}$ moles) of Titanium (IV) butoxide and then stirred for 15 minutes. To this 2.150 g (0.0106 moles) of 1,12 DD and 2.218 g (0.0151 moles) of AA were added and the temperature was raised to 170° C. over 45 minutes. After 6 hours of reaction, 170 mm Hg of vacuum was applied and the reaction was continued for further 4 hours. The polyester obtained was dissolved in chloroform and precipitated in cold methanol. The precipitate was filtered and washed with methanol two times and then air dried for 24 hours. The molar composition of 1,12 DD, AA and GMA in unsaturated polyester was determined by peak integral value of $^1$H NMR spectrum. The weight average molecular weight of unsaturated polyester was determined by Gel Permeation Chromatography using Styragel column and tetrahydrofuran as eluting solvent at the rate of 1 ml/min. Polystyrene was used as standard. The molar composition of the unsaturated polyester and its weight average molecular weight were 43:50:7 (1,12 DD:AA:GMA) and 19410 g mol$^{-1}$ respectively.

B. Preparation of Graft Copolymer

The graft copolymer was prepared by solution polymerization. The unsaturated polyester P [1,12 DD-AA-GMA], MAA and 1% wt/wt. of free radical initiator azobisisobutyronitrile were dissolved in dimethylformamide. After purging with nitrogen, polymerization was carried out at 65° C. for 20 hours. The polymer solution was concentrated by using rota-evaporator. The polymer was precipitated into cold water and dried at room temperature under vacuum. The said graft copolymer was prepared as to incorporate four different levels of MAA by varying the weight ratio of the unsaturated polyester to MAA in the feed. The MAA content of the graft copolymers and their swelling/dissolution behavior in 0.1 N HCl and in pH 6.8 phosphate buffer solutions are summarized in Table 4. The graft copolymers did not contain free unsaturations and they dissolved in common organic solvents and their mixtures.

A. Preparation of Unsaturated Poly (Ester-Ether)

The unsaturated poly (ester-ether) was prepared by melt polycondensation of DEG, DDA and TMPMA using Titanium (IV) butoxide and hydroquinone. The reaction was carried out in a two neck round-bottom flask equipped with a nitrogen containing bladder and a water cooled condenser. The flask was charged with 3.416 g (0.0168 moles) of TMPMA, 0.180 g (1.6347×10$^{-03}$ moles) of hydroquinone and 0.030 g (8.8152×10$^{-05}$ moles) of Titanium (IV) butoxide and then stirred for 15 minutes. To this 7.170 g (0.0675 moles) of DEG and 19.441 g (0.0844 moles) of DDA were added and the temperature was raised to 170° C. over 45 minutes. After 6 hours of reaction, 170 mm Hg of vacuum was applied and the reaction was continued for further 4 hours. The poly (ester-ether) obtained was dissolved in chloroform and precipitated in cold methanol. The precipitate was filtered and washed with methanol two times and then air dried for 24 hours. The molar composition of DEG, DDA and TMPMA in unsaturated poly (ester-ether) was determined by peak integral value of $^1$H NMR spectrum. The weight average molecular weight of unsaturated poly (ester-ether) was determined by Gel Permeation Chromatography using Styragel column and tetrahydrofuran as eluting solvent at the rate of 1 ml/min. Polystyrene was used as standard. The molar composition of the unsaturated poly (ester-ether) and its weight average molecular weight was 42:52:6 (DEG:DDA:TMPMA) and 9520 g mol$^{-1}$ respectively.

B. Preparation of Graft Copolymer

The graft copolymer was prepared by solution polymerization. The unsaturated poly (ester-ether) P [DEG-DDA-TMPMA], MAA and 1% wt/wt. of free radical initiator azobisisobutyronitrile were dissolved in dimethylformamide. After purging with nitrogen, polymerization was carried out at 65° C. for 20 hours. The polymer solution was concentrated by using rota-evaporator. The polymer was precipitated into cold water and dried at room temperature under vacuum. The said graft copolymer was prepared as to incorporate four different levels of MAA by varying the weight ratio of the unsaturated poly (ester-ether) to MAA in the feed. The MAA content of the graft copolymers and their swelling/dissolution behavior in 0.1 N HCl and in pH 6.8 phosphate buffer solutions are summarized in Table 5. The graft copolymers did not contain free unsaturations and they dissolved in common organic solvents and their mixtures.

TABLE 4

The swelling degree of the graft copolymer

| Dissolution Medium | Time (hours) | Methacrylic acid content (wt %) | | | |
|---|---|---|---|---|---|
| | | 23 | 36 | 43 | 48 |
| 0.1N HCl Solution | 1 | 1.24 | 2.11 | 3.73 | 1.46 |
| | 2 | 1.52 | 2.65 | 5.86 | 1.8 |
| pH 6.8 phosphate buffer solution | 3 | 21.27 | 28.21 | 186.44 | 265.65 |
| | 4 | 70.06 | 198.21 | 279.23 | 434.98 |
| | 5 | 78.72 | 220.95 | 374.06 | 598.56 |
| | 7 | 86.93 | 367.53 | 510.03 | 772.36 |
| | 9 | 129.17 | 373.01 | 596.69 | 790.57 |
| | 24 | 143.76 | 294.10 | 213.23 | 198.24 |

TABLE 5

The swelling degree of the graft copolymer

| Dissolution Medium | Time (hours) | Methacrylic acid content (wt %) | | | |
|---|---|---|---|---|---|
| | | 29 | 37 | 47 | 51 |
| 0.1N HCl Solution | 1 | 1.43 | 1.43 | 2.25 | 2.09 |
| | 2 | 1.68 | 1.74 | 2.93 | 2.35 |
| pH 6.8 phosphate buffer solution | 3 | 25.70 | 49.79 | 72.01 | 69.19 |
| | 4 | 104.65 | 121.87 | 185.46 | 58.70 |
| | 5 | 172.21 | 131.88 | 148.48 | 51.26 |
| | 7 | 276.78 | 114.28 | 79.74 | 42.70 |
| | 9 | 368.05 | 65.77 | 32.68 | −9.82 |
| | 24 | 453.24 | 10.41 | Dissolved | Dissolved |

EXAMPLE 5

This example discloses the preparation of P

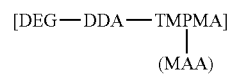

graft copolymer.

This involves, the preparation of (a) unsaturated poly (ester-ether) P [DEG-DDA-TMPMA] and (b) graft copolymerization on said unsaturated poly (ester-ether) with MAA.

EXAMPLE 6

This example discloses the preparation of P

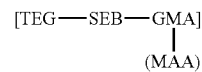

graft copolymer.

This involves, the preparation of (a) unsaturated poly (ester-ether) P [TEG-SEB-GMA] and (b) graft copolymerization on said unsaturated poly (ester-ether) with MAA.

A. Preparation of Unsaturated Poly (Ester-Ether)

The unsaturated poly (ester-ether) was prepared by melt polycondensation of TEG, SEB and GMA using Titanium (IV) butoxide and hydroquinone. The reaction was carried out in a two neck round-bottom flask equipped with a nitrogen containing bladder and a water cooled condenser. The flask was charged with 6.095 g (0.0428 moles) of GMA, 0.500 g ($4.5409 \times 10^{-03}$ moles) of hydroquinone and 0.050 g ($1.4692 \times 10^{-04}$ moles) of Titanium (IV) butoxide and then stirred for 15 minutes. To this 15.020 g (0.1 moles) of TEG and 28.908 g (0.1429 moles) of SEB were added and the temperature was raised to 170° C. over 45 minutes. After 6 hours of reaction, 170 mm Hg of vacuum was applied and the reaction was continued for further 4 hours. The poly (ester-ether) obtained was dissolved in chloroform and precipitated in cold methanol. The precipitate was filtered and washed with methanol two times and then air dried for 24 hours. The molar composition of TEG, SEB and GMA in unsaturated poly (ester-ether) was determined by peak integral value of $^1$H NMR spectrum. The weight average molecular weight of unsaturated poly (ester-ether) was determined by Gel Permeation Chromatography using Styragel column and tetrahydrofuran as eluting solvent at the rate of 1 ml/min. Polystyrene was used as standard. The molar composition of the unsaturated poly (ester-ether) and its weight average molecular weight was 40:52:8 (TEG:SEB:GMA) and 11258 g respectively.

B. Preparation of Graft Copolymer

The graft copolymer was prepared by solution polymerization. The unsaturated poly (ester-ether) P [TEG-SEB-GMA], MAA and 1% wt/wt. of free radical initiator azobisisobutyronitrile were dissolved in dimethylformamide. After purging with nitrogen, polymerization was carried out at 65° C. for 20 hours. The polymer solution was concentrated by using rota-evaporator. The polymer was precipitated into cold water and dried at room temperature under vacuum. The said graft copolymer was prepared as to incorporate four different levels of MAA by varying the weight ratio of the unsaturated poly (ester-ether) to MAA in the feed. The MAA content of the graft copolymers and their swelling/dissolution behavior in 0.1 N HCl and in pH 6.8 phosphate buffer solutions are summarized in Table 6. The graft copolymers did not contain free unsaturations and they dissolved in common organic solvents and their mixtures.

TABLE 6

The swelling degree of the graft copolymer

| Dissolution Medium | Time (hours) | Methacrylic acid content (wt %) | | | |
|---|---|---|---|---|---|
| | | 24 | 30 | 48 | 54 |
| 0.1N HCl Solution | 1 | 5.89 | 5.75 | 3.16 | 4.37 |
| pH 6.8 phosphate buffer solution | 2 | 6.07 | 5.78 | 3.22 | 4.64 |
| | 3 | 124.97 | −28.83 | −59.94 | −97.12 |
| | 4 | 150.49 | −77.36 | −89.76 | Dissolved |
| | 5 | 97.66 | −90.35 | −96.19 | — |
| | 7 | −10.27 | −96.85 | Dissolved | — |
| | 9 | −57.01 | Dissolved | — | — |
| | 24 | −92.59 | — | — | — |

EXAMPLE 7

This example discloses the preparation of P

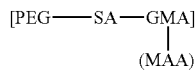

graft copolymer.

This involves, the preparation of (a) unsaturated poly (ester-ether) P [PEG-SA-GMA] and (b) graft copolymerization on said unsaturated poly (ester-ether) with MAA.

A. Preparation of Unsaturated Poly (Ester-Ether)

The unsaturated poly (ester-ether) was prepared by melt polycondensation of PEG ($M_n$~400), SA and GMA using Titanium (IV) butoxide and hydroquinone. The reaction was carried out in a two neck round-bottom flask equipped with a nitrogen containing bladder and a water cooled condenser. The flask was charged with 2.908 g (0.0204 moles) of GMA, 0.180 g ($1.6347 \times 10^{-03}$ moles) of hydroquinone and 0.030 g ($8.8152 \times 10^{-05}$ moles) of. Titanium (IV) butoxide and then stirred for 15 minutes. To this 19.100 g (0.0477 moles) of PEG and 8.055 g (0.0682 moles) of SA were added and the temperature was raised to 170° C. over 45 minutes. After 6 hours of reaction, 170 mm Hg of vacuum was applied and the reaction was continued for further 4 hours. The poly (ester-ether) obtained was directly used for the graft copolymerization. The molar composition of PEG, SA and GMA in unsaturated poly (ester-ether) was determined by peak integral value of $^1$H NMR spectrum. The weight average molecular weight of unsaturated poly (ester-ether) was determined by Gel Permeation Chromatography using Styragel column and tetrahydrofuran as eluting solvent at the rate of 1 ml/min. Polystyrene was used as standard. The molar composition of the unsaturated poly (ester-ether) and its weight average molecular weight were 43:49:8 (PEG:SA:GMA) and 8432 g mol$^{-1}$ respectively.

B. Preparation of Graft Copolymer

The graft copolymer was prepared by solution polymerization. The unsaturated poly (ester-ether) P [PEG-SA-GMA], MAA and 1% wt/wt. of free radical initiator azobisisobutyronitrile were dissolved in dimethylformamide. After purging with nitrogen, polymerization was carried out at 65° C. for 20 hours. The polymer solution was concentrated by using rota-evaporator. The polymer was precipitated into cold water and dried at room temperature under vacuum. The said graft copolymer was prepared as to incorporate four different levels of MAA by varying the weight ratio of the unsaturated poly (ester-ether) to MAA in the feed. The MAA content of the graft copolymers and their swelling/dissolution behavior in 0.1 N HCl and in pH 6.8 phosphate buffer solutions are summarized in Table 7. The graft copolymers did not contain free unsaturations and they dissolved in common organic solvents and their mixtures.

TABLE 7

The swelling degree of the graft copolymer

| Dissolution Medium | Time (hours) | Methacrylic acid content (wt %) | | | |
|---|---|---|---|---|---|
| | | 38 | 44 | 49 | 56 |
| 0.1N HCl Solution | 1 | 1.55 | 2.98 | 2.81 | 1.09 |
| | 2 | 1.72 | 3.56 | 3.39 | 1.40 |
| pH 6.8 phosphate buffer solution | 3 | Dissolved | Dissolved | Dissolved | Dissolved |

EXAMPLE 8

This example discloses the preparation of P

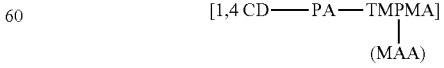

graft copolymer.

This involves, the preparation of (a) unsaturated polyester P [1,4 CD-PA-TMPMA] and (b) graft copolymerization on said unsaturated polyester with MAA.

A. Preparation of Unsaturated Polyester

The unsaturated polyester was prepared by melt polycondensation of 1,4 CD, PA and TMPMA using Titanium (IV) butoxide and hydroquinone. The reaction was carried out in a two neck round-bottom flask equipped with a nitrogen containing bladder and a water cooled condenser. The flask was charged with 2.407 g (0.0119 moles) of TMPMA, 0.200 g ($1.8163 \times 10^{-03}$ moles) of hydroquinone and 0.020 g ($5.8768 \times 10^{-05}$ moles) of Titanium (IV) butoxide and then stirred for 15 minutes. To this 7.820 g (0.0542 moles) of 1,4 CD and 9.795 g (0.0661 moles) of PA were added and the temperature was raised to 170° C. over 45 minutes. After 6 hours of reaction, 170 mm Hg of vacuum was applied and the reaction was continued for further 4 hours. The polyester obtained was dissolved in chloroform and precipitated in cold methanol. The precipitate was filtered and washed with methanol two times and then air dried for 24 hours. The molar composition of 1,4 CD, PA and TMPMA in unsaturated polyester was determined by peak integral value of $^1$H NMR spectrum. The weight average molecular weight of unsaturated polyester was determined by Gel Permeation Chromatography using Styragel column and tetrahydrofuran as eluting solvent at the rate of 1 ml/min. Polystyrene was used as standard. The molar composition of the unsaturated polyester and its weight average molecular weight were 46:49:5 (1,4 CD:PA:TMPMA) and 2652 g mol$^{-1}$ respectively.

B. Preparation of Graft Copolymer

The graft copolymer was prepared by solution polymerization. The unsaturated polyester P [1,4 CD-PA-TMPMA], methacrylic acid and 1% wt/wt. of free radical initiator azobisisobutyronitrile were dissolved in dimethylformamide. After purging with nitrogen, polymerization was carried out at 65° C. for 20 hours. The polymer solution was concentrated by using rota-evaporator. The polymer was precipitated into cold water and dried at room temperature under vacuum. The said graft copolymer was prepared as to incorporate four different levels of MAA by varying the weight ratio of the unsaturated polyester to MAA in the feed. The MAA content of the graft copolymers and their swelling/dissolution behavior in 0.1 N HCl and in pH 6.8 phosphate buffer solutions are summarized in Table 8. The graft copolymers did not contain free unsaturations and they dissolved in common organic solvents and their mixtures.

TABLE 8

The swelling degree of the graft copolymer

| Dissolution Medium | Time (hours) | Methacrylic acid content (wt %) | | | |
|---|---|---|---|---|---|
| | | 26 | 35 | 43 | 51 |
| 0.1N HCl Solution | 1 | 2.75 | 4.83 | 6.06 | 3.90 |
| | 2 | 2.94 | 4.99 | 6.16 | 4.44 |
| pH 6.8 phosphate buffer solution | 3 | 59.66 | 68.30 | 151.26 | 146.26 |
| | 4 | 60.73 | 117.58 | 172.19 | 188.05 |
| | 5 | 84.13 | 149.66 | 239.73 | 252.87 |
| | 7 | 90.50 | 151.59 | 323.55 | 354.90 |
| | 9 | 95.93 | 168.59 | 337.10 | 425.26 |
| | 24 | 109.19 | 313.52 | 403.23 | 164.17 |

EXAMPLE 9

This example discloses the preparation of P

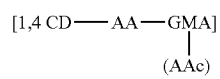
(AAc)

graft copolymer.

This involves, the preparation of (a) unsaturated polyester P [1,4 CD-AA-GMA] and (b) graft copolymerization on said unsaturated polyester with AAc.

A. Preparation of Unsaturated Polyester

The unsaturated polyester was prepared by melt polycondensation of 1,4 CD, AA and GMA using Titanium (IV) butoxide and hydroquinone. The reaction was carried out in a two neck round-bottom flask equipped with a nitrogen containing bladder and a water cooled condenser. The flask was charged with 6.869 g (0.0483 moles) of GMA, 0.500 g ($4.5409 \times 10^{-03}$ moles) of hydroquinone and 0.050 g ($1.4692 \times 10^{-04}$ moles) of Titanium (IV) butoxide and then stirred for 15 minutes. To this 17.920 g (0.1242 moles) of 1,4 CD and 25.221 g (0.1725 moles) of AA were added and the temperature was raised to 170° C. over 45 minutes. After 6 hours of reaction, 170 mm Hg of vacuum was applied and the reaction was continued for further 4 hours. The polyester obtained was dissolved in chloroform and precipitated in cold methanol. The precipitate was filtered and washed with methanol two times and then air dried for 24 hours. The molar composition of 1,4 CD, AA and GMA in unsaturated polyester was determined by peak integral value of $^1$H NMR spectrum. The weight average molecular weight of unsaturated polyester was determined by Gel Permeation Chromatography using Styragel column and tetrahydrofuran as eluting solvent at the rate of 1 ml/min. Polystyrene was used as standard. The molar composition of the unsaturated polyester and its weight average molecular weight were 40:54:6 (1,4 CD:AA:GMA) and 10344 g mol$^{-1}$ respectively.

B. Preparation of Graft Copolymer

The graft copolymer was prepared by solution polymerization. The unsaturated polyester P [1,4 CD-AA-GMA], AAc and 1% wt/wt. of free radical initiator azobisisobutyronitrile were dissolved in dimethylformamide. After purging with nitrogen, polymerization was carried out at 65° C. for 20 hours. The polymer solution was concentrated by using rota-evaporator. The polymer was precipitated into cold water and dried at room temperature under vacuum. The said graft copolymer was prepared as to incorporate four different levels of AAc by varying the weight ratio of the unsaturated polyester to AAc in the feed. The AAc content of the graft copolymers and their swelling/dissolution behavior in 0.1 N HCl and in pH 6.8 phosphate buffer solutions are summarized in Table 9. The graft copolymers did not contain free unsaturations and they dissolved in common organic solvents and their mixtures.

TABLE 9

The swelling degree of the graft copolymer

| Dissolution Medium | Time (hours) | Acrylic acid content (wt %) | | | |
|---|---|---|---|---|---|
| | | 23 | 31 | 37 | 42 |
| 0.1N HCl Solution | 1 | 3.00 | 2.72 | 3.05 | 2.77 |
| | 2 | 3.15 | 2.99 | 3.24 | 3.13 |
| pH 6.8 phosphate buffer solution | 3 | 135.90 | 151.91 | 207.38 | 391.93 |
| | 4 | 217.50 | 253.55 | 303.98 | 283.36 |
| | 5 | 247.56 | 297.42 | 183.26 | 187.84 |
| | 7 | 269.65 | 266.37 | 54.90 | −7.48 |
| | 9 | 200.97 | 187.55 | −36.33 | −47.34 |
| | 24 | −42.63 | −92.26 | Dissolved | Dissolved |

EXAMPLE 10

This example discloses the preparation of P

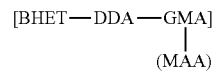
(MAA)

graft copolymer.

This involves, the preparation of (a) unsaturated polyester P [BHET-DDA-GMA] and (b) graft copolymerization on said unsaturated polyester with MAA.

A. Preparation of Unsaturated Polyester

The unsaturated polyester was prepared by melt polycondensation of BHET, DDA and GMA using Titanium (IV) butoxide and hydroquinone. The reaction was carried out in a two neck round-bottom flask equipped with a nitrogen containing bladder and a water cooled condenser. The flask was charged with 3.731 g (0.0262 moles) of GMA, 0.500 g ($4.5409 \times 10^{-03}$ moles) of hydroquinone and 0.050 g ($1.4692 \times 10^{-04}$ moles) of Titanium (IV) butoxide and then stirred for 15 minutes. To this 21.135 g (0.0831 moles) of BHET and 25.190 g (0.1093 moles) of DDA were added and the temperature was raised to 170° C. over 45 minutes. After 6 hours of reaction, 170 mm Hg of vacuum was applied and the reaction was continued for further 4 hours. The polyester obtained was dissolved in chloroform and precipitated in cold methanol. The precipitate was filtered and washed with methanol two times and then air dried for 24 hours. The molar composition of BHET, DDA and GMA in unsaturated polyester was determined by peak integral value of $^1$H NMR spectrum. The weight average molecular weight of unsaturated polyester was determined by Gel Permeation Chromatography using Styragel column and tetrahydrofuran as eluting solvent at the rate of 1 ml/min. Polystyrene was used as standard. The molar composition of the unsaturated polyester and its weight average molecular weight were 41:52:1 (BHET:DDA:GMA) and 11784 g mol$^{-1}$ respectively.

B. Preparation of Graft Copolymer

The graft copolymer was prepared by solution polymerization. The unsaturated polyester P [BHET-DDA-GMA], MAA and 1% wt/wt. of free radical initiator azobisisobutyronitrile were dissolved in dimethylformamide. After purging with nitrogen, polymerization was carried out at 65° C. for 20 hours. The polymer solution was concentrated by using rotaevaporator. The polymer was precipitated into cold water and dried at room temperature under vacuum. The said graft copolymer was prepared as to incorporate four different levels of MAA by varying the weight ratio of the unsaturated polyester to MAA in the feed. The MAA content of the graft copolymers and their swelling/dissolution behavior in 0.1 N HCl and in pH 6.8 phosphate buffer solutions are summarized in Table 10. The graft copolymers did not contain free unsaturations and they dissolved in common organic solvents and their mixtures.

TABLE 10

The swelling degree of the graft copolymer

| Dissolution Medium | Time (hours) | Methacrylic acid content (wt %) | | | |
|---|---|---|---|---|---|
| | | 26 | 34 | 40 | 47 |
| 0.1N HCl Solution pH 6.8 phosphate buffer solution | 1 | 1.52 | 1.56 | 1.42 | 2.59 |
| | 2 | 2.21 | 3.46 | 2.27 | 4.16 |
| | 3 | 13.37 | 26.25 | 35.69 | 49.64 |
| | 4 | 16.99 | 48.70 | 57.34 | 70.46 |
| | 5 | 20.41 | 54.76 | 66.44 | 86.95 |
| | 7 | 25.61 | 66.46 | 73.53 | 98.35 |
| | 9 | 38.23 | 75.37 | 78.84 | 112.33 |
| | 24 | 112.37 | 278.09 | 394.63 | 462.12 |

It will be evident to those skilled in the art that the invention is not limited to the details of the foregoing illustrative examples and that the present invention may be embodied in other specific forms without departing from the essential attributes thereof, and it is therefore desired that the present embodiments and examples be considered in all respects as illustrative and not restrictive, reference being made to the appended claims, rather than to the foregoing description, and all changes which come within the meaning and range of equivalency of the claims are therefore intended to be embraced therein.

ADVANTAGES OF THE INVENTION

The graft copolymer of the invention exhibits pH dependant behavior.

The solvent soluble pH sensitive polymers (P) of the invention swell and or dissolve at near and above neutral pH while remaining in collapsed state at acidic pH.

pH dependent graft copolymer (P) is useful as protective coating material for pharmaceutical dosage form and as an excipient in the development of extended release formulations.

We claim:

1. A graft copolymer (P) of formula 1

Formula 1 comprises:
   a. a backbone having the formula P $[A_{(x)} B_{(y)} C_{(Z)}]$ comprising a diol (A), a dicarboxylic acid or acid anhydride (B) and a monomer containing pendant unsaturation (C), wherein (x)=37-46%, (y)=49-55% (z)=5-8% by mole; and
   b. a graft which is a polymer of the acidic monomer (D) and 'w' is weight percent of the total weight of the graft copolymer such that 'w' is 22-56%; wherein the graft copolymer swells at pH>4.7.

2. The graft copolymer as claimed in claim 1, wherein the backbone is poly (ester-ether) or polyester.

3. The graft copolymer as claimed in claim 1, wherein the dicarboxylic acid is selected from the group consisting of succinic acid, glutaric acid, adipic acid, pimelic acid, suberic acid, azelaic acid, sebacic acid and dodecanedioic acid.

4. The graft copolymer as claimed in claim 1, wherein the acid anhydride is selected from the group consisting of succinic anhydride and phthalic anhydride.

5. The graft copolymer as claimed in claim 1, wherein the acidic monomer is a carboxylic acid selected from the group consisting of acrylic acid and methacrylic acid.

6. The graft copolymer as claimed in claim 1, wherein the graft copolymer is soluble in organic solvents selected from
   dimethylformamide,
   dimethylacetamide,
   tetrahydrofuran, and
   a mixture of organic solvents selected from the group consisting of chloroform-methanol, chloroform-ethanol, 1,2-dichloromethane-methanol and 1,2-dichloromethane-ethanol.

7. The graft copolymer as claimed in claim 1, wherein the graft copolymer swells and dissolves at pH>4.7.

8. The graft copolymer as claimed in claim 1, wherein the diol is selected from the group consisting of aliphatic diol, cycloaliphatic diol and aromatic dial.

9. The graft copolymer as claimed in claim 8, wherein the aliphatic diol is selected from the group consisting of diethylene glycol, triethylene glycol, tetraethylene glycol, dipropylene glycol, tripropylene glycol, polyethylene glycol having an $M_n$ of about 200, polyethylene glycol having an $M_n$ of about 400, polyethylene glycol having an $M_n$ of about 1000, polyethylene glycol having an $M_n$ of about 2000, 1,2-ethane diol, 1,3-propane diol, 1,2-propane diol, 2-methyl-1,3-propane diol, 1,4-butane diol, 1,3-butane diol, 1,2-butane diol, 1,5-pentane diol, 1,6-hexane diol, 1,7-heptane diol, 1,8-octane diol, 1,9-nonane dial and 1,12-dodecane diol.

10. The graft copolymer as claimed in claim 8, wherein the cycloaliphatic diol is 1,4-cyclohexanedimethanol.

11. The graft copolymer as claimed in claim 8, wherein the aromatic diol is bis(2-hydroxyethyl) terephthalate.

12. The graft copolymer as claimed in claim 1, wherein the monomer containing pendant unsaturation is an epoxy monomer or a diol monomer.

13. The graft copolymer as claimed in claim 12, wherein the epoxy monomer is selected from the group consisting of glycidyl methacrylate and glycidyl acrylate.

14. The graft copolymer as claimed in claim 12, wherein the diol monomer is selected from the group consisting of trimethylolpropane monomethacrylate and trimethylolpropane monoacrylate.

15. A process for preparation of graft copolymer as claimed in claim 1, comprising the steps of i. stirring monomer (C), titanium (IV) butoxide and hydroquinone in two neck round bottom flask for 10-15 minutes;

ii. adding diol (A), dicarboxylic acid or acid anhydride (B) and raising the temperature to 160-170° C. over 45 minutes, applying vacuum of 170 mm Hg at the end of 5-7 hours and continuing the reaction for 3-5 hours to obtain unsaturated polyester or unsaturated poly (ester-ether);

iii. dissolving the unsaturated polyester or unsaturated poly (ester-ether) as obtained in step (ii) in chloroform and precipitating in cold methanol;

iv. filtering, washing with methanol and drying for 20-25 hours to obtain unsaturated polyester or unsaturated poly (ester-ether);

v. dissolving the unsaturated polyester or unsaturated poly (ester-ether) as obtained in step (iv), acidic monomer and azobisisobutyronitrile in dimethyl formamide followed by purging with nitrogen and polymerizing at 60-70° C. for 18-22 hours; and vi. concentrating, precipitating and drying to obtain graft copolymer.

* * * * *